UNITED STATES PATENT OFFICE 2,452,190

POLYMERIZATION OF OLEFINS

Stanford J. Hetzel, Cheltenham, and Robert M. Kennedy, Drexel Hill, Pa., assignors to Sun Oil Company, Philadelphia, Pa., a corporation of New Jersey No Drawing. Application October 30, 1945, Serial No. 625,693

8 Claims. (Cl. 260—683.15)

This invention relates to the polymerization of compounds containing two carbon atoms and a double bond per molecule, particularly to the polymerization or conversion of normally gaseous hydrocarbons, more particularly ethylene, employing a novel solid catalyst permitting the use of advantageous operating conditions, for example, materially lower pressures.

The invention may be applied to various compounds of two carbon atoms and a double bond per molecule. It will, however, be described as applied to the polymerization of ethylene to which it is pre-eminently suited for reasons apparent from this specification and claims.

The polymerization of ethylene is known to be difficult to accomplish in a regulable manner such that good yields of desired products can be obtained. In fact, to date, no known commercial process is available which can efficiently polymerize ethylene at low pressures. For example, the lowest pressure described in the prior art literature for a process for the polymerization of ethylene employing a catalyst, known to us, requires pressures of the order of 750 lbs./sq. in.-1,000 lbs./sq. in Ipatieff and Pines, Ind. and Eng. Chem., vol. 27, page 1364 (1935). In the patent art, known to us, the pressures at which ethylene is stated to be polymerizable are in the range 250 lbs./sq. in.-1000 lbs./sq. in. The preferred pressures in this range are stated to be in excess of 500 lbs./sq. in According to one embodiment of the present invention ethylene can be polymerized by contacting it at considerably lower pressures than heretofore reported and at a polymerization temperature, hereinafter defined, with a catalyst consisting essentially of silica gel, alumina and nickel.

Among its various novel features the invention comprises a catalyst composition which enables the efficient polymerization of ethylene in a regulable manner such that good yields of desired products can be obtained at relatively low pressures. For example, according to the invention ethylene can be polymerized or converted into good yields of hydrocarbon products boiling within the motor fuel range without formation of substantial undesired heavier fractions employing operating pressures as low as 30 lbs./sq. in. Even lower pressures can be employed.

The successful operation of the process of the invention is dependent among other things upon the selection of conditions of contact time, temperature, pressure and of catalyst as more fully described hereinafter.

The time of contact of the ethylene with the catalyst of the invention will preferably be such as to allow it to be converted to the degree desired. Charging rates of 2 grams–6 grams of ethylene per minute per 100 grams of catalyst have been employed. It is, however, within the scope of the invention to employ lower or higher charging rates or contact times with or without recycling of any incompletely reacted gases. For example, incompletely reacted or unreacted gases can be treated in subsequent zones wherein an identical catalyst is employed. Or, if desired, the composition of the catalyst may be different, but within the proportions and ranges claimed herein, in said zones.

The temperature employed for the polymerization or conversion of ethylene can be in the range 350° C.–450° C., preferably 380° C.–420° C. and will depend at least to some extent upon correlation with the other conditions employed in the process. The table indicates other specific conditions which have been employed. Other temperatures above or below the indicated ranges are not excluded from the scope of the invention.

| Catalyst Composition | | | Conditions | | | Yield, Weight Per Cent | | | | Unreacted, Wt. Per Cent per pass |
|---|---|---|---|---|---|---|---|---|---|---|
| | | | | | | Dimer | | Trimer, etc. | | |
| Silica Gel | Alumina | Nickel | Rate [1] | Temp. | Press | Single Pass | On Recycle | Single Pass | On Recycle | |
| Per cent | Per cent | Per cent | | °C. | P.s.i. | | | | | |
| 99 | ½ | ½ | .0292 | 400 | 60 | 25.4 | 46.3 | 10.4 | 18.9 | 45.0 |
| 98 | 1 | 1 | .0185 | 400 | 60 | 20.8 | 36.4 | 26.2 | 45.8 | 42.8 |
| 96 | 2 | 2 | .0222 | 400 | 60 | 22.5 | 53.3 | 9.0 | 21.2 | 57.6 |
| 94½ | 1 | 4½ | .0309 | 400 | 60 | 23.5 | 43.6 | 11.9 | 22.1 | 46.2 |
| 90 | 5 | 5 | .0220 | 400 | 60 | 13.3 | 28.4 | 7.3 | 15.6 | 53.2 |
| 80 | 10 | 10 | .0195 | 400 | 60 | 6.1 | 14.4 | 7.1 | 16.9 | 57.9 |
| 98 | 1 | 1 | .0106 | 400 | 30 | 21.9 | ----- | 8.9 | ----- | ---------- |
| 98 | 1 | 1 | .0135 | 400 | 100 | 6.3 | ----- | 5.3 | ----- | ---------- |

[1] Rate, in grams gas/minute/gram catalyst.

As stated, a feature of the invention is the relatively low pressure at which ethylene can be polymerized or converted by passing it into contact with the herein described catalyst at the temperatures aforementioned. It is quite unexpected that ethylene can be efficiently polymerized at low pressures in regulable manner with good yields and without formation of substantial quantities of undesired products. Contrasted with the high pressures described in the prior art, the relatively low pressures of the invention are of particular advantage in the construction and operation of equipment required for the process. For example, pressures in the range of 30 lbs./sq. in-150 lbs./sq. in., preferably 50 lbs./sq. in-70 lbs./sq. in., can be employed. Higher or lower pressures are not excluded from the scope of the invention. However, it is particularly noteworthy that materially lower pressures, than those heretofore known, for the polymerization of ethylene are made possible by the process of the invention employing the catalyst which will now be described.

As stated, the catalyst consists essentially of silica gel, alumina and nickel. In one method the catalyst is prepared by impregnating silica gel particles, of size desired, with a water or other solution of aluminum and nickel salts. Solutions of aluminum and nickel nitrates, of desired concentration, were added to a known quantity of silica gel in an evaporating dish. The mixture was evaporated to dryness, with stirring, and then ignited for about eight to ten hours or until the salts were completely decomposed. This was followed by reduction with hydrogen at elevated temperature.

The catalyst of the invention will preferably consist of a major proportion of silica gel and minor proportions of alumina and nickel. Compositions 80%–99.98% silica gel, 0.01%–10% alumina and 0.01%–10% nickel, preferably 90%–99% silica gel, ½%–5% alumina and ½%–5% nickel can be employed for good results. A catalyst having a composition of about 96% silical gel, about 2% alumina and about 2% nickel has been employed with good results.

A catalyst having an approximate composition of 98% silica gel, 1% alumina and 1% nickel was prepared by adding one liter of an aqueous solution containing 97 grams of nickel nitrate, $Ni(NO_3)_2 \cdot 6H_2O$, and 75 grams of aluminum nitrate, $Al(NO_3)_3 \cdot 9H_2O$, to 2 kilograms of silica gel (4–8 mesh) in an evaporating dish. The mixture was evaporated to dryness, with stirring, and then ignited at a temperature of about 300° C. for about nine hours to convert the nitrates to their respective oxides. Prior to use the catalyst mass was charged into a catalyst tube and ignited for one hour with air at 400° C. to ensure complete conversion to the oxides and to remove traces of water. It was then reduced with a slow stream of hydrogen for about nine hours at 400° C. to convert the nickel oxide to nickel.

Activity of the catalyst appears to be highest for any given nickel concentration when the nickel to alumina ratio is high, preferably in the range of from 1–200 although higher ratios can be used. By "nickel to alumina ratio" is meant that value obtained by dividing the quantity of nickel present by the quantity of alumina present. While the quantity of alumina should be substantially smaller than that of the nickel it is absolutely necessary that an appreciable quantity of alumina be present. The alumina content of the catalyst is preferably to be relatively low. The nickel concentration is preferably within the range of 0.5%–2.5%. However, it should be noted that only those compositions are to be selected, when applying the foregoing ratio consideration and preferred concentration values, which fall entirely within the overall range of composition of silica gel 80%–99.98%, alumina 0.01%–10% and nickel 0.01%–10%.

While the catalyst has been described to contain silica gel, alumina and nickel, it is possible to substitute cobalt for the nickel, although this is not, at present, preferred.

The period of activity of the catalyst will naturally vary with circumstances of its use. A practical conversion can be obtained for periods up to 5 hours without regeneration. The catalyst can be regenerated many times to substantially its original activity. After seventy-five regenerations, tests have shown that the activity was essentially unchanged.

While simultaneous impregnation with aluminum and nickel nitrate has been described it will be apparent to those versed in the catalyst art that other methods for preparation of the composition of the invention can be employed, although that described is presently preferred.

Also, for starting materials in the preparation of the catalyst composition any compound of aluminum, which upon ignition will yield alumina in activated form upon silica gel, and nickel salt, which will yield nickel oxide on ignition and which can be reduced subsequently to nickel on the silica gel, can be employed, the essence of the invention being insofar as it relates to the catalyst in the specific combinations of materials as set forth.

For example, freshly precipitated aluminum hydroxide can be admixed with nickel hydroxide and added to silica gel and the whole ignited and then reduced as set forth previously. Or, if desired an aluminum compound and a nickel compound can be distributed on silica gel and the entire mass ignited in air followed by reduction of the ignited mass. As stated, other methods of preparation, apparent to those versed in the art can also be employed.

In co-pending application Serial No. 625,692, filed October 30, 1945, by the instant inventors, there is described and claimed a catalyst composition consisting by weight of 80%–99.98% silica gel, 0.01%–10% alumina and 0.01%–10% nickel. Also, in copending application Serial No. 625,694, filed October 30, 1945, by the instant inventors, there is described and claimed a process for the polymerization of olefins containing three or more carbon atoms per molecule employing a catalyst consisting by weight of 80%–99.98% silica gel, 0.01%–10% alumina and 0.01%–10% nickel.

The foregoing has been written for purposes of disclosure and it will be obvious to those versed in the art that wide variation and modification within the scope of the invention is possible for the polymerization or conversion of ethylene for the production of desired polymers or compounds thereof, for example, compounds suitable for further processing into a fuel for internal combustion or other engines, the essence of the invention being that compounds containing two carbon atoms and a double bond can be polymerized or converted in good yield at low pressures when employing a catalyst consisting essentially of silica gel, alumina and nickel prepared and compounded in the manner and proportions described and claimed in the appended claims.

The polymerization of ethylene may also be effected, under conditions as hereinbefore described, by means of a catalyst composition similar to the present composition but which contains chromia in place of alumina. Such polymerization is not herein claimed as it forms the subject matter of our divisional application Serial No. 742,193, filed April 17, 1947.

We claim:

1. A process for the polymerization of ethylene which comprises contacting ethylene under polymerizing conditions with a catalyst consisting essentially of silica gel, alumina and a metal selected from the group consisting of nickel and cobalt.

2. A process for the polymerization of ethylene which comprises contacting ethylene under polymerizing conditions with a catalyst consisting essentially of a major proportion of silica gel and relatively minor proportions of alumina and a metal selected from the group consisting of nickel and cobalt.

3. A process for the polymerization of ethylene which comprises contacting ethylene at a temperature within the range 350° C.–450° C. and at a pressure within the range 30 lbs./sq. in.–150 lbs./sq. in. with a catalyst consisting essentially of a major proportion of silica gel and relatively minor proportions of alumina and a metal selected from the group consisting of nickel and cobalt.

4. A process for the polymerization of ethylene according to claim 3 which comprises contacting ethylene under said polymerizing conditions with a catalyst consisting by weight of 80–99.98% silica gel, .01–10% alumina and .01–10% of a metal selected from the group consisting of nickel and cobalt and wherein the selected metal ratio to alumina ratio for a given selected metal ratio to catalyst is within 1–200 and the selected metal concentration is within 0.5–2.5%.

5. A process for the polymerization of ethylene according to claim 3 which comprises contacting ethylene at a temperature within 380° C.–420° C. and at a pressure within 50 lbs./sq. in.–70 lbs./sq. in. with a catalyst consisting by weight of 90–99% silica gel, ½–5% alumina and ½–5% of a metal selected from the group consisting of nickel and cobalt.

6. A process according to claim 5 wherein 2 grams–6 grams ethylene are contacted with each 100 grams of catalyst per minute.

7. A process according to claim 5 wherein said catalyst is prepared by adding aluminum and nickel nitrates in aqueous solution to silica gel, evaporating and igniting the mass and then reducing the ignited mass.

8. Process according to claim 2 wherein the catalyst consists essentially of silica gel, alumina and nickel.

STANFORD J. HETZEL.
ROBERT M. KENNEDY.

REFERENCES CITED

The following references are of record in the file of this patent:

UNITED STATES PATENTS

| Number | Name | Date |
| --- | --- | --- |
| 2,129,649 | Cross et al. | Sept. 13, 1938 |
| 2,332,276 | Stahly | Oct. 19, 1943 |
| 2,380,358 | Anderson | July 10, 1945 |
| 2,381,198 | Bailey et al. | Aug. 7, 1945 |